United States Patent
Hirakura (10) Patent No.: US 11,669,000 B2
(45) Date of Patent: Jun. 6, 2023

(54) OPTICAL DEVICE, METHOD FOR CONTROLLING OPTICAL DEVICE, AND IMAGE DISPLAY APPARATUS

(71) Applicant: SEIKO EPSON CORPORATION, Tokyo (JP)

(72) Inventor: Takao Hirakura, Matsumoto (JP)

(73) Assignee: Seiko Epson Corportation, Tokyo (JP)

( * ) Notice: Subject to any disclaimer, the term of this patent is extended or adjusted under 35 U.S.C. 154(b) by 322 days.

(21) Appl. No.: 16/874,762

(22) Filed: May 15, 2020

(65) Prior Publication Data

US 2020/0363707 A1   Nov. 19, 2020

(30) Foreign Application Priority Data

May 16, 2019   (JP) .............................. JP2019-092673

(51) Int. Cl.
  *G03B 21/14*   (2006.01)
(52) U.S. Cl.
  CPC .................................. *G03B 21/142* (2013.01)
(58) Field of Classification Search
  CPC ..... G03B 21/00–64; H04N 9/31–3197; H04N 5/00–956; G09G 3/007; G02F 1/29
  See application file for complete search history.

(56) References Cited

U.S. PATENT DOCUMENTS

| | | | |
|---|---|---|---|
| 6,065,231 A | 5/2000 | Suzuki et al. | |
| 7,509,946 B2 | 3/2009 | Cooke et al. | |
| 9,664,980 B2 | 5/2017 | Mizoguchi et al. | |
| 2008/0047529 A1* | 2/2008 | Cooke | F02D 41/2096 123/478 |
| 2014/0293247 A1* | 10/2014 | Abe | H04N 9/3188 353/101 |
| 2018/0047321 A1 | 2/2018 | Hirakura | |

FOREIGN PATENT DOCUMENTS

| | | |
|---|---|---|
| JP | 2002-250970 A | 9/2002 |
| JP | 3958819 B2 | 8/2007 |
| JP | 2008-51106 A | 3/2008 |
| JP | 2011-158589 A | 8/2011 |
| JP | 2016-071232 A | 5/2016 |
| JP | 2016-186557 A | 10/2016 |

* cited by examiner

Primary Examiner — Toan Ton
Assistant Examiner — Christopher A Lamb, II
(74) Attorney, Agent, or Firm — Dority & Manning, P.A.

(57) ABSTRACT

A method for controlling an optical device including a movable section including an optical section that refracts incident video image light in accordance with the angle of incidence of the video image light and outputs the refracted video image light and a holding section that supports the optical section, and an actuator that causes the movable section to swing, the method including applying a drive signal to the actuator to cause the movable section to swing. The drive signal is a trapezoidal wave having a trapezoidal waveform. Each leg section of the trapezoidal wave is formed of a first leg section and a second leg section connected to the first leg section. The inclination of the second leg section respect to the flat section of the trapezoidal wave is smaller than the inclination of the first leg section with respect to the flat section of the trapezoidal wave.

11 Claims, 8 Drawing Sheets

OPTICAL DEVICE, METHOD FOR CONTROLLING OPTICAL DEVICE, AND IMAGE DISPLAY APPARATUS

The present application is based on, and claims priority from JP Application Serial Number 2019-092673, filed May 16, 2019, the disclosure of which is hereby incorporated by reference herein in its entirety.

BACKGROUND

1. Technical Field

The present disclosure relates to an optical device, a method for controlling the optical device, and an image display apparatus including the optical device.

2. Related Art

To increase the resolution of a projected image as compared with the resolution of a light modulator, such as a liquid crystal panel, there has been a known technology for shifting the axis of video image light outputted from the light modulator.

For example, in the projection-type display apparatus described in JP-A-2011-158589, an optical path changing plate for shifting the optical axis of video image light by half the size of a pixel is provided. In detail, the projection-type display apparatus is so driven and controlled that a state in which the optical path changing plate inclines by a predetermined angle toward the positive side and a state in which the optical path changing plate inclines by a predetermined angle toward the negative side are alternately iterated to increase the resolution of a projected image. In this process, to ensure the quality of the image, it is necessary to prolong the period for which the positive and negative predetermined angle inclination states are maintained, so that a drive signal for driving the optical path changing plate is skillfully designed in JP-A-2011-158589. In detail, the polarity of current is changed from positive to negative and vice versa by using a sinusoidal wave as the waveform of portions of the drive signal that are the portions where low potential is switched to high potential and vice versa (see FIG. 8).

In the drive method described in JP-A-2011-158589, however, the sinusoidal wave portions causes the optical path changing plate to swing to the side opposite the intended side for an instant, resulting in a problem of blurred video image light. In view of the problem, the present inventors have proposed that a trapezoidal wave is used as the drive signal, as in the image display apparatus described in JP-A-2016-71232. The proposed method does not cause the change in the polarity, positive or negative, when low potential is switched to high potential and vice versa.

Figure 10:
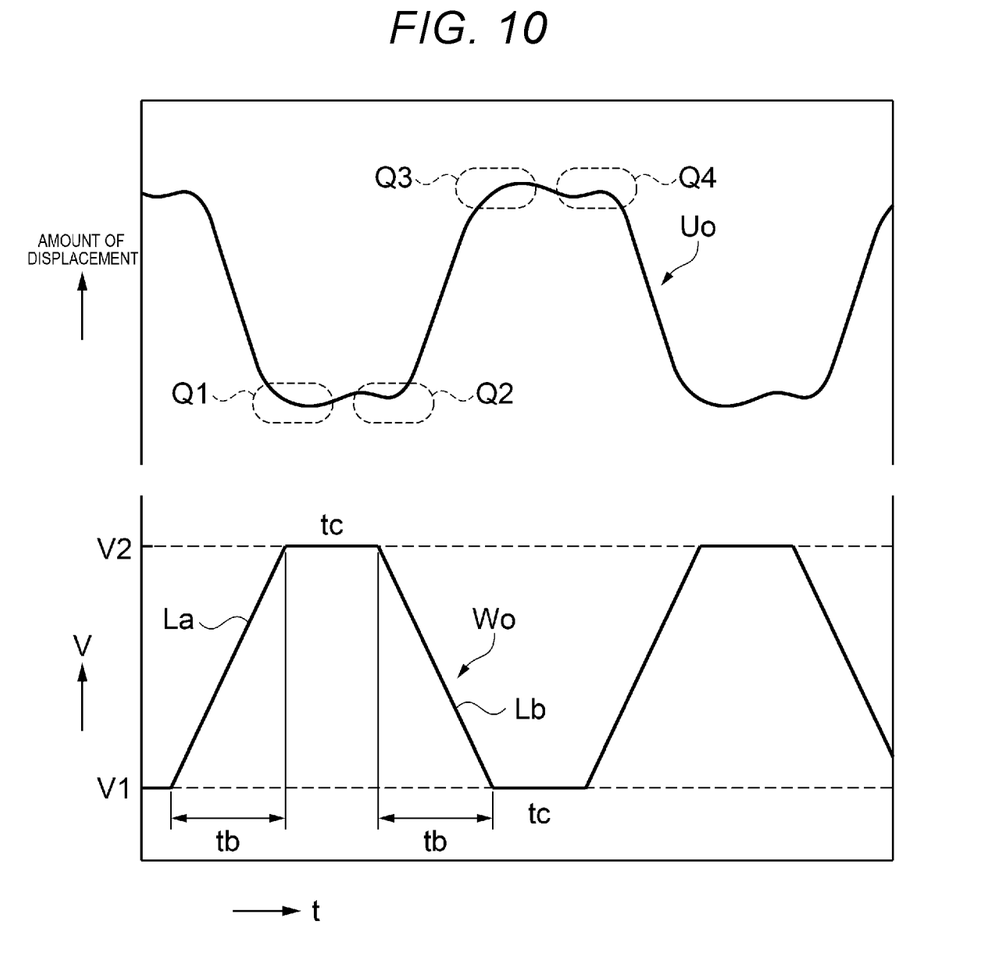
FIG. 10 shows a drive signal in related art and the resultant trajectory of the optical path shifting device.

Using the drive signal shown in JP-A-2016-71232 allows generation of a less-blurred, higher-quality image than an image generated by the drive signal shown in JP-A-2011-158589, but there is still room for improvement. In detail, when a waveform Wo of a simple trapezoidal wave is used as the drive signal, the motion of the optical path changing plate substantially follows the trapezoidal wave, but undershoots and overshoots occur at the linear portions corresponding to the lower and upper bases of the trapezoidal wave, as indicated by a trajectory Uo, as shown in FIG. 10, resulting in a problem of degradation in image quality. FIG. 10 will be described later in detail.

SUMMARY

A method for controlling an optical device according to the present application is a method for controlling an optical device including a movable section including an optical section that refracts incident video image light in accordance with an angle of incidence of the video image light and outputs the refracted video image light and a holding section that supports the optical section, and an actuator that causes the movable section to swing, the method including applying a drive signal to the actuator to cause the movable section to swing. The drive signal is a trapezoidal wave having a trapezoidal waveform. Each leg section of the trapezoidal wave has a first straight line and a second straight line connected to the first straight line. Inclination of the second straight line with respect to a flat section of the trapezoidal wave is smaller than inclination of the first straight line with respect to the flat section of the trapezoidal wave. The drive signal is applied to the actuator along the first straight line, and the drive signal is then applied to the actuator along the second straight line.

In the method for controlling an optical device described above, the flat sections of the trapezoidal wave may be formed of high-potential and low-potential flat sections, and the first straight line may switch to the second straight line at a point of time in middle of a rising period required for the potential to transition from the low potential to the high potential.

In the method for controlling an optical device described above, the first straight line may switch to the second straight line at a point of time in middle of a falling period required for the potential to transition from the high potential to the low potential.

An optical device according to the present application includes a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator. The drive signal is a trapezoidal wave having a trapezoidal waveform. Each leg section of the trapezoidal wave has a first straight line and a second straight line connected to the first straight line. Inclination of the second straight line with respect to a flat section of the trapezoidal wave is smaller than inclination of the first straight line with respect to the flat section of the trapezoidal wave. The drive circuit applies the drive signal to the actuator along the first straight line and then applies the drive signal to the actuator along the second straight line.

An image display apparatus according to the present application includes the optical device described above and a projection optical system that enlarges and projects the video image light outputted from the optical device.

DESCRIPTION OF EXEMPLARY EMBODIMENTS

An embodiment of the present disclosure will be described below with reference to the drawings. In the following drawings, each layer and each portion are so drawn at scales different from actual scales as to be large enough to be recognizable on the drawings.

EMBODIMENT

1) Overview of Projector

Figure 1:
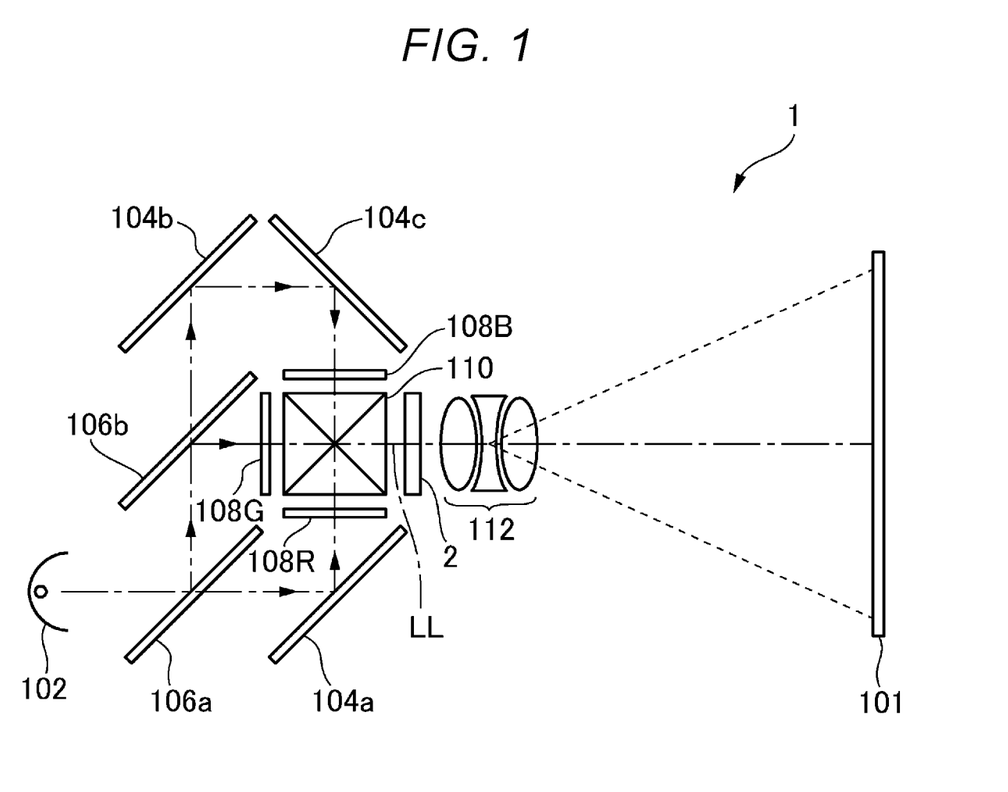
FIG. 1 is a schematic configuration diagram of a projector according to an embodiment.

FIG. 1 is a descriptive diagram showing the optical configuration of a projector according to the present embodiment. The configuration of a projector 1 according to the present embodiment will first be described.

The projector 1 as an image display apparatus is an LCD-based projector. The projector 1 is an apparatus that displays video images on a screen 101 based on an externally inputted video signal. The projector 1 is formed of a light source 102, mirrors 104a, 104b, and 104c, dichroic mirrors 106a and 106b, liquid crystal display elements 108R, 108G, and 108B, a dichroic prism 110, an optical path shifting device 2, a projection optical system 112, and other components.

Examples of the light source 102 may include a halogen lamp, a mercury lamp, a light emitting diode (LED), and a laser light source. The light source 102 is a light source that outputs white light. The light outputted from the light source 102 is separated by the dichroic mirror 106a, for example, into red light (R) and other light. The red light is reflected off the mirror 104a and then incident on the liquid crystal display element 108R. The other light is further separated by the dichroic mirror 106b into green light (G) and blue light (B). The green light is reflected off the dichroic mirror 106b and then incident on the liquid crystal display element 108G. The blue light passes through the dichroic mirror 106b, is then reflected off the mirrors 104b and 104c, and is then incident on the liquid crystal display element 108B.

The liquid crystal display elements 108R, 108G, and 108B are each used as a spatial light modulator. The liquid crystal display elements 108R, 108G, and 108B are transmissive spatial light modulators corresponding to the three primary colors of light, R, G, and B, and each include pixels arranged in a matrix formed, for example, of 1080 vertically arranged rows and 1920 horizontally arranged columns. The pixels each adjust the amount of light that passes through the pixel with respect to the amount of light incident on the pixel, and the liquid crystal display elements 108R, 108G, and 108B cooperatively control the distribution of the amounts of light over the entire pixels. The light fluxes spatially modulated by the thus configured liquid crystal display elements 108R, 108G, and 108B are combined with one another by the dichroic prism 110, and the combined light is outputted as full-color video image light LL from the dichroic prism 110. The outputted video image light LL travels via the optical path shifting device 2, is enlarged by the projection optical system 112, and is projected by the projection optical system 112 onto the screen 101.

The optical path shifting device 2 as an optical device is disposed between the dichroic prism 110 and the projection optical system 112. In the projector 1, the optical path shifting device 2 shifts the optical path of the video image light LL in accordance with the angle of incidence thereof, and an image having resolution higher than the resolution of the liquid crystal display elements 108R, 108G, and 108B is projected on the screen 101. For example, when the liquid crystal display elements 108R, 108G, and 108B are each a full-high-vision display element, a 4K image is displayed. The optical path shift is also called "pixel shift."

2) Overview of Pixel Shift

Figure 2:
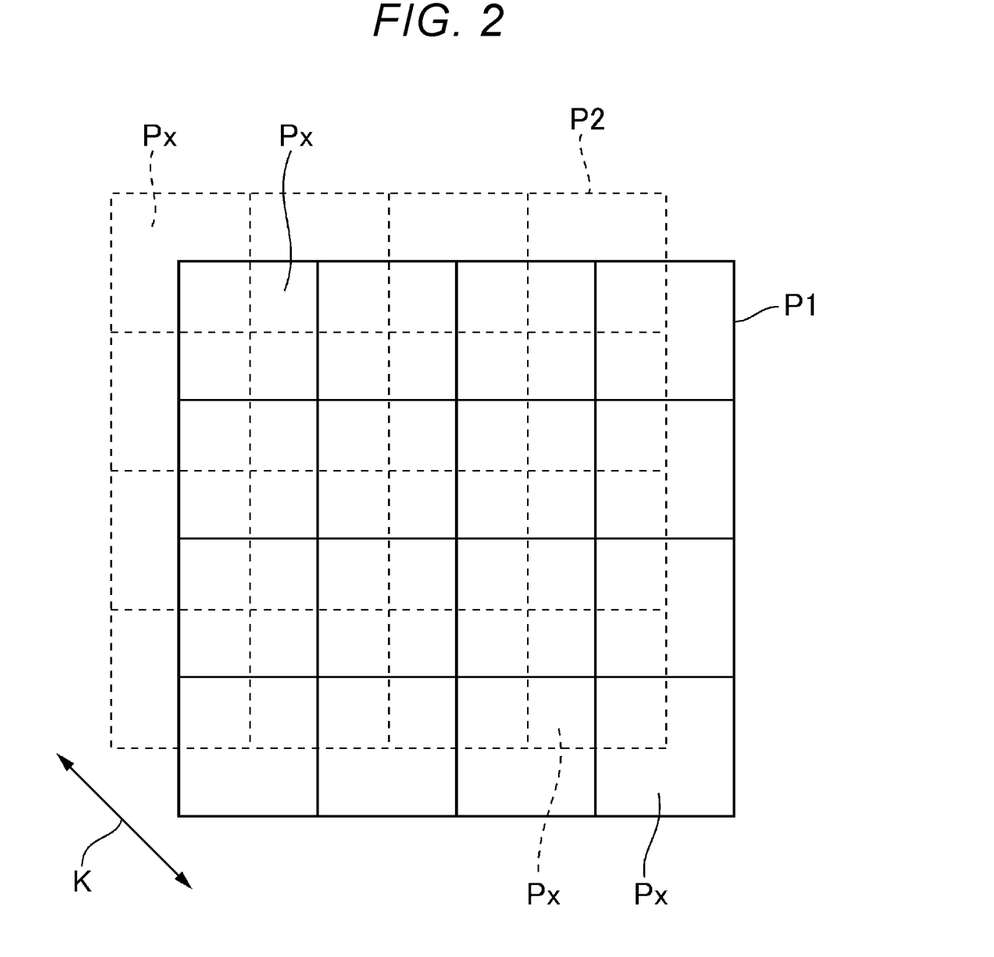
FIG. 2 shows a state in which an image display position is shifted by video image light pixel shift.

FIG. 2 shows a state in which an image display position is shifted by the video image light pixel shift.

The principle of the increase in resolution based on the pixel shift will be described with reference to FIG. 2.

The optical path shifting device 2 includes an optical path changing plate 30 (FIG. 5) as an optical section that transmits the video image light LL and changes the attitude of the optical path changing plate 30, which is a light-transmissive plate-shaped member, to shift the optical path of the video image light LL by using refraction thereof.

The projector 1 uses the optical path shift described above to alternately display an image in an image display position P1 where the optical path of the video image light LL is shifted to one side and an image display position P2 where the optical path of the video image light LL is shifted to the other side. The image display positions P1 and P2 are positions shifted from each other by a half pixel in a diagonal direction K of pixels Px on the screen 101. The half pixel refers to one half of each of the pixels Px. The pixel shift described above allows an increase in the apparent number of pixels, whereby the resolution of the image projected on the screen 101 can be increased. The amount of shift between the image display positions P1 and P2 is not limited to the half pixel and may, for example, be one-fourth or three-fourths of each of the pixels Px. Further, the pixels are not necessarily shifted in an oblique direction and may instead be shifted in the upward or downward direction or the rightward or leftward direction. Even when the pixels are shifted in the upward, downward, rightward, or leftward direction, the resolution of a projected image can be increased.

3) Circuit Block Configuration

Figure 3:
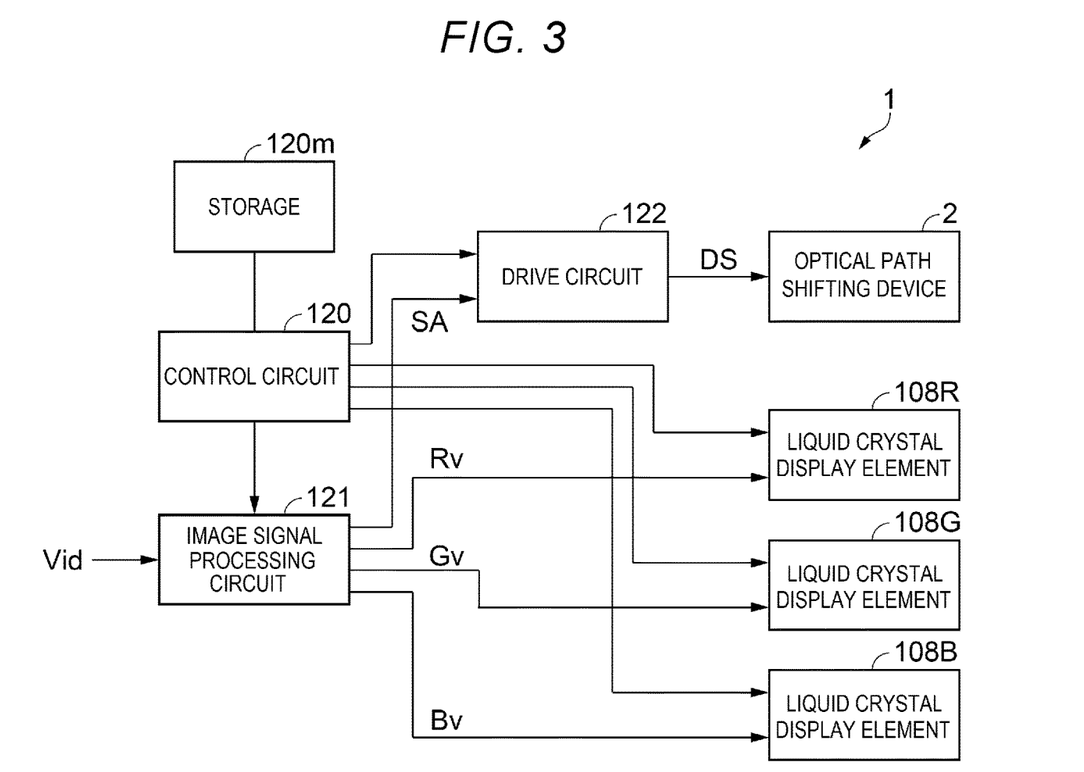
FIG. 3 is a circuit block diagram showing the electrical configuration of the projector.

FIG. 3 is a circuit block diagram showing the electrical configuration of the projector.

The projector 1 is formed of a control circuit 120, an image signal processing circuit 121, a drive circuit 122, and other components.

The control circuit 120 is a micro-controller unit (MCU) and controls the operation of the projector 1 including operation of writing data signals onto the liquid crystal display elements 108R, 108G, and 108B, optical path shift operation performed by the optical path shifting device 2, and data signal generation operation performed by the image signal preprocessing circuit 121. The control circuit 120 accompanies a storage 120m formed, for example, of a nonvolatile memory, a ROM, and a RAM, and the storage 120m stores data on the drive waveform of a drive signal DS, a variety of programs for controlling the operation of the projector 1, and data associated with the programs.

The image signal processing circuit 121 separates an image signal Vid supplied from an external apparatus into R, G, and B signals corresponding to the three primary colors of light and converts the signals into data signals Rv, Gv, and By suitable for the operation of the liquid crystal display elements 108R, 108G, and 108B. The converted data signals Rv, Gv, and Bv are supplied to the liquid crystal display elements 108R, 108G, and 108B, respectively, and the liquid crystal display elements 108R, 108G, and 108B are so driven as to display images based on the data signals. The image signal processing circuit 121 may be formed of a digital signal processor (DSP), an application specific integrated circuit (ASIC), a programmable logic device (PLD), a field programmable gate array (FPGA), or any other circuit.

The drive circuit 122 is a circuit that generates the drive signal DS for driving the optical path shifting device 2. The drive circuit 122 generates the drive signal DS based on a synchronization signal SA inputted from the image signal processing circuit 121 and supplies the drive signal DS to the optical path shifting device 2. The drive circuit 122 may be formed of a digital signal processor (DSP), an application specific integrated circuit (ASIC), a programmable logic device (PLD), a field programmable gate array (FPGA), or any other circuit.

Figure 4:
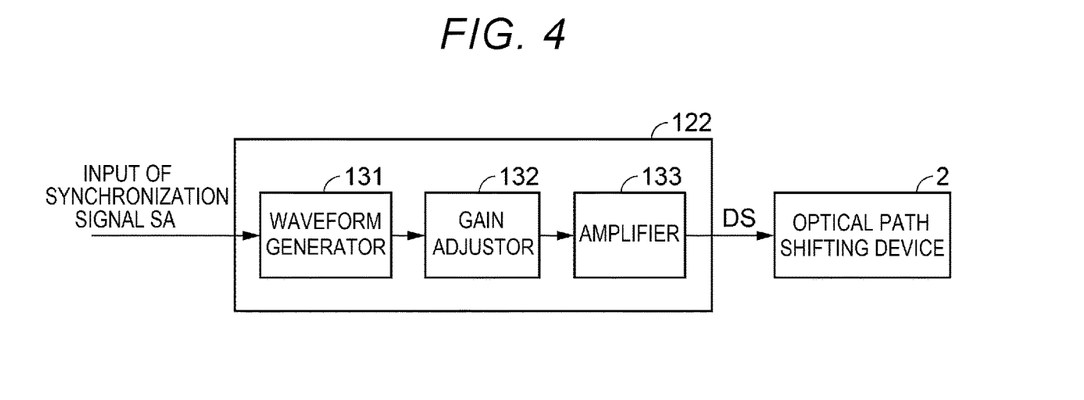
FIG. 4 is a circuit block diagram of a drive circuit.

FIG. 4 is a circuit block diagram of the drive circuit.

The drive circuit 122 includes a waveform generator 131, a gain adjuster 132, an amplifier 133, and other components, which generate the drive signal DS and adjust the waveform of the drive signal DS.

The waveform generator 131 includes a D/A converter and generates a trapezoidal drive signal based on the synchronization signal SA, which has a rectangular shape and synchronizes with an image. Specifically, using synchronization signal SA as a trigger, the D/A converter converts the drive waveform data, which is digital data and is stored in the storage 120m, into an analog signal and outputs the analog signal. Using the D/A converter as described above to change the frequency of a conversion clock allows generation of a desired waveform, such as a trapezoidal wave having changed inclination of leg sections. In detail, changing the drive waveform data allows generation of a rectangular wave, a sinusoidal wave, a trapezoidal wave, and also the combination thereof.

The gain adjuster 132 includes a digital potentiometer, which changes the amplitude of the trapezoidal signal generated by the waveform generator 131. In a preferable example, the gain adjuster 132 includes an I²C bus as an interface and is configured to be capable of electrically changing resistance in accordance with a control signal from the control circuit 120.

The amplifier 133 includes an operational amplifier, which amplifies the trapezoidal signal having a gain adjusted by the gain adjuster 132, and supplies the amplified signal to an actuator in the optical path shifting device 2.

4) Configuration of Optical Path Shifting Device

Figure 5:
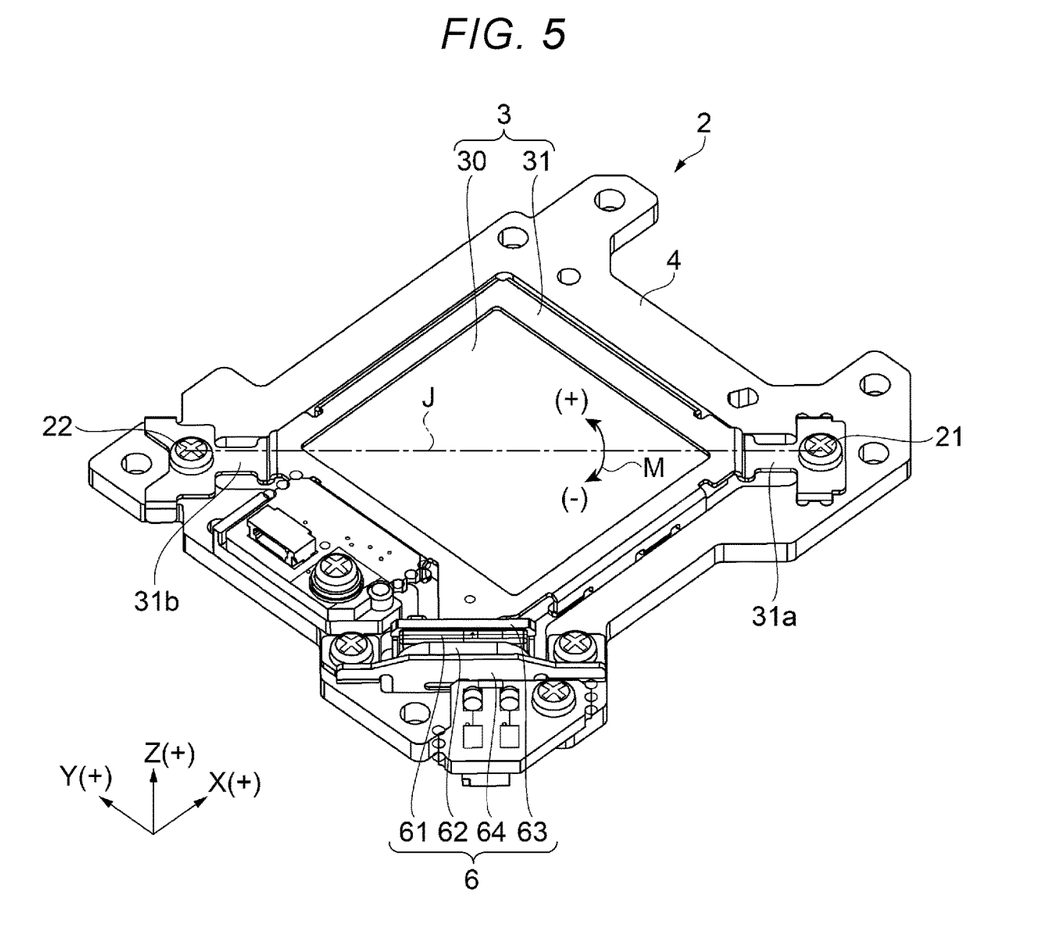
FIG. 5 is a perspective view of an optical path shifting device.

FIG. 5 is a perspective view of the optical path shifting device according to the present embodiment.

The configuration of the optical path shifting device 2 will next be described.

The optical path shifting device 2 is formed, for example, of a movable section 3, a support 4, and an actuator 6. In FIG. 5, the dichroic prism 110 (FIG. 1) is located on a side of the optical path shifting device 2 that is the side facing the positive side of the axis-Z direction, and the projection optical system 112 (FIG. 1) is located on a side of the optical path shifting device 2 that is the side facing the negative side of the axis-Z direction. In other words, the optical path shifting device 2 is so disposed that the video image light is incident on the optical path changing plate 30 of the optical path shifting device 2 from above the plane of view of FIG. 5 and exits toward the projection optical system 112 (FIG. 1), which is located on the rear side of the plane of view.

The movable section 3 is formed, for example, of the optical path changing plate 30, which serves as the optical section, and a holding frame 31, which holds the optical path changing plate 30. The optical path changing plate 30 is formed of a white sheet glass plate having a substantially square shape in a preferable example. Employing a white sheet glass plate that excels in strength allows an increase in rigidity of the movable section 3 as a whole, whereby deflection unevenness of the light deflected by the optical path changing plate 30 can be suppressed. The optical path changing plate 30 is not limited to a white sheet glass plate and may instead be made of any material having optical transparency and capable of refracting the video image light, such as borosilicate glass, quartz glass, and a variety of other glass materials. Still instead, the optical path changing plate 30 may be made of any of a variety of crystal materials, such as quartz and sapphire, or any of a variety of resin materials, such as a polycarbonate-based resin material and an acrylic resin material. The optical path changing plate 30 does not necessarily have a substantially square shape and may have any shape capable of refracting the video image light, such as an oblong shape, a rhombus shape, and an elliptical shape.

The holding frame 31 is a metal frame-shaped holding frame and supports the outer circumferential edge of the optical path changing plate 30 to accommodate the optical path changing plate 30 with the front and rear surfaces thereof exposed. In a preferable example, the holding frame 31 is made of stainless steel, and the optical path changing plate 30 is fixed to the holding frame 31 with an adhesive and integrated therewith. A first shaft 31a, which is a protruding portion in the form of a flange, is formed at one vertex portion of the holding frame 31. A screw hole is formed in the first shaft 31a, and the first shaft 31a is fixed to the support 4 with a screw 21. A second shaft 31b, which is a protruding portion similar to the first shaft 31a, is formed at a vertex portion of the holding frame 31 that is the vertex portion diagonal to the vertex portion at which first shaft 31a is formed. A screw hole is formed in the second shaft 31b, and the second shaft 31b is fixed to the support 4 with a screw 22. The holding frame 31 is not limited to a frame-shaped member that supports the entire outer circumferential edge of the optical path changing plate 30 and only needs to be a member that supports at least part of the optical path changing plate 30. The holding frame 31 corresponds to an example of the "holding section" in the present disclosure.

The support 4 is a support member made of a resin material and having a frame-like shape one-size larger than the holding frame 31. The movable section 3, the actuator 6, and other components are attached to the support 4. The movable section 3, specifically, a main body portion thereof primarily formed of the optical path changing plate 30 is accommodated in a central hole of the support 4 and attached to the support 4 via the first shaft 31a and the second shaft 31b, which protrude in the form of ear-shaped portions from diagonal portions of the movable section 3. The diagonal line that connects the first shaft 31a and the second shaft 31b to each other serves as an axis of swing motion J, and the movable section 3 can change its attitude in the pivotal direction indicated by the arrow M around the axis of swing motion J. In other words, since the movable section 3 having a substantially square shape is fixed to the support 4 along the axis of swing motion J, diagonal portions of the movable section 3 that are located on the diagonal line that intersects the axis of swing motion J are swingable around the axis of swing motion J. Therefore, the movable section 3 has a zero-inclination neutral attitude in the initial state, whereas the movable section 3 in the driven state undergoes iterative motion that causes the movable section 3 to alternately incline by a predetermined angle toward the positive side of the arrow M and a predetermined angle toward the negative side of the arrow M. In the present specification, the iterative motion is also referred to as swing motion.

The actuator 6 is disposed at a diagonal portion of the support 4 that is the diagonal portion facing one of the swingable portions of the movable section 3. The actuator 6 is formed, for example, of a magnet 61, a magnet frame 63, a coil 62, and a coil frame 64. The magnet 61 and the magnet frame 63 are attached to the holding frame 31 of the movable section 3. The coil 62 and the coil frame 64 are attached to the support 4.

5) Configuration of Actuator

Figure 6:
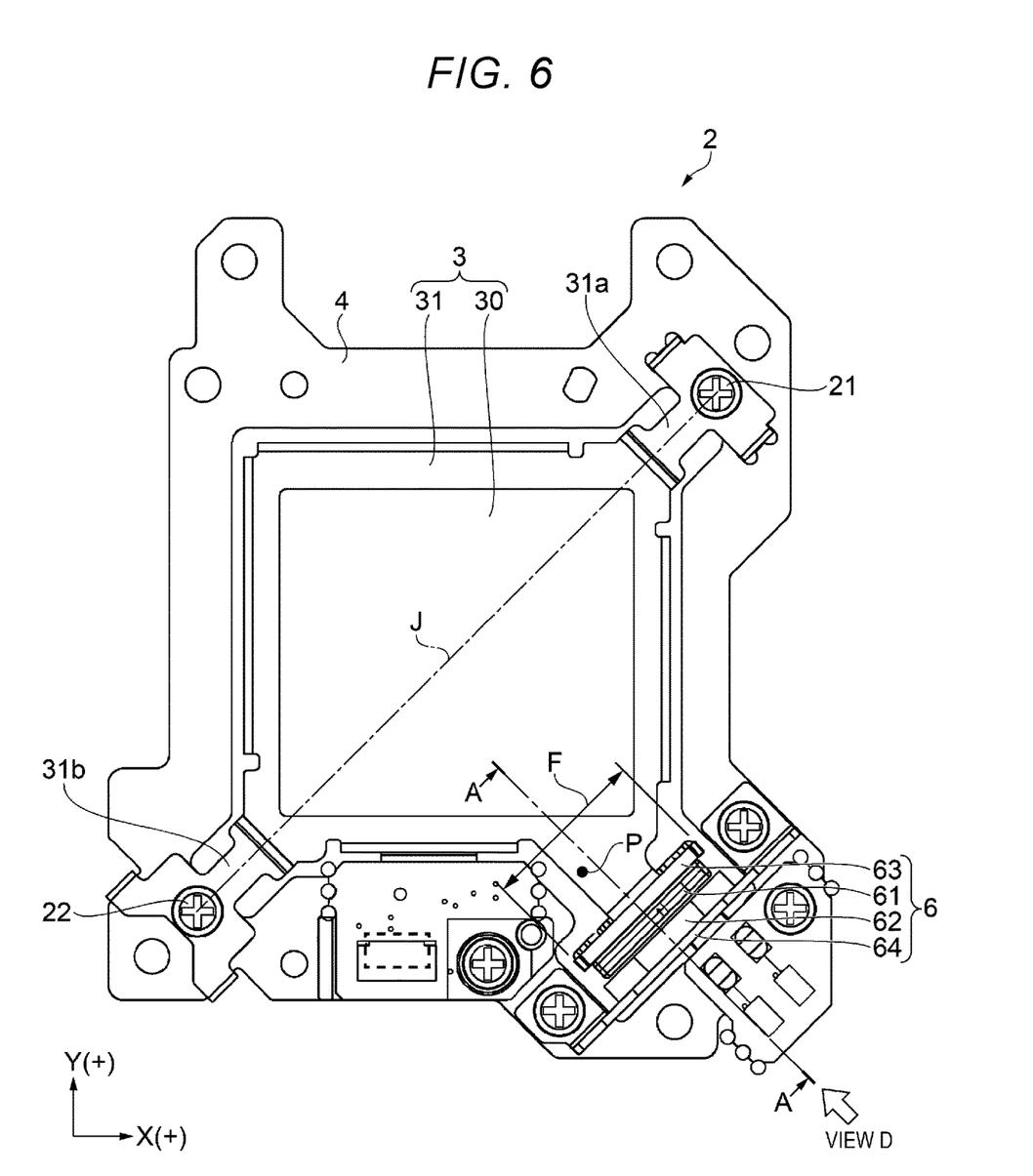
FIG. 6 is a plan view of the optical path shifting device.
Figure 7:
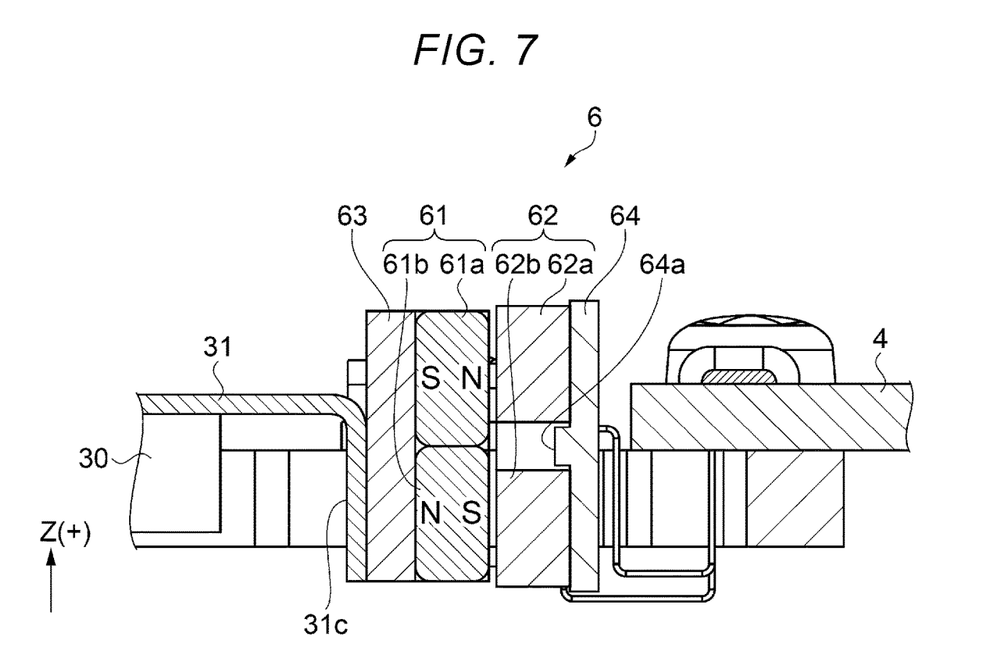
FIG. 7 is a cross-sectional view of the optical path shifting device taken along the line A-A in FIG. 6.

FIG. 6 is a plan view of the optical path shifting device. FIG. 7 is a cross-sectional view of the optical path shifting device taken along the line A-A in FIG. 6. The configuration of the actuator 6 will next be described with reference to FIGS. 6 and 7.

A vertex portion of the holding frame 31 that is the vertex portion facing the actuator 6 is folded to form an L-letter-shaped portion, which forms a flange 31c, to which the magnet frame 63 is attached, as shown in FIG. 7. The magnet frame 63 is fixed to the flange 31c. The magnet 61 is attached to the magnet frame 63. The magnet frame 63 is made of a metal, such as iron, and functions as a back yoke.

The magnet 61 is formed of a magnet 61a and a magnet 61b, which each have a rod-like shape and are stacked on each other along the axis Z. The magnet 61a is a rod-shaped magnet elongated in the depth direction in FIG. 7. The dimension F in FIG. 6 represents the length of the magnet 61a. The magnet 61a is so disposed that the north pole thereof faces the coil 62. The magnet 61b is also a rod-shaped magnet having the same length as that of the magnet 61a and is so disposed that the south pole thereof faces the coil 62. As a preferable example, the magnet 61 is a neodymium magnet. The magnet 61 is not limited to a neodymium magnet and may be any permanent magnet having intended magnetic force, such as a samarium-cobalt magnet, a ferrite magnet, or an alnico magnet.

The coil frame 64 and the coil 62 are attached in the presented order to the support 4. In detail, the coil 62 is attached to the coil frame 64, and the coil frame 64 is so fixed to the support 4 that the coil 62 faces the magnet 61 with a gap therebetween. The coil frame 64 is made of a metal, such as iron, and functions as a back yoke.

The view D in FIG. 6 represents a viewpoint from which the coil 62 is viewed along the axial direction of the windings of the coil. In the view D, the coil 62 is an air-core coil having a chamfered oblong shape. The chamfered oblong shape is also called a track shape. The longitudinal length of the coil 62 is substantially equal to the length of the magnet 61a.

A protrusion 64a, which guides the winding position of the coil 62, is formed as part of the coil frame 64, and the coil 62 is so disposed as to surround the protrusion 64a, as shown in FIG. 7. A side of the protrusion 64a that is the side facing the magnet 61 forms a hollow portion. In the initial state in which the movable section 3 does not incline, the longitudinal side 62a of the coil 62 faces the magnet 61a and the longitudinal side 62b of the coil 62 faces the magnet 61b.

In the configuration described above, when the coil 62 is energized, current flows through the coil 62 to produce a magnetic field, which causes the coil 62 to repel or attract magnets 61a and 61b, so that a vertex portion of the movable section 3 that is the vertex portion facing the magnet 61 and the vertex portion diagonal to the aforementioned vertex portion undergo reciprocating motion substantially along the axis Z, resulting in swing motion of the entire movable section 3 around the axis of swing motion J.

The present embodiment employs what is called a "moving-magnet-type configuration" in which the magnet 61 is disposed in the movable section 3. Therefore, heat generated by the energized coil 62 is not likely to be transferred to the movable section 3 or the optical path changing plate 30, whereby a change in the resonance frequency of the movable section 3, bending of the optical path changing plate 30, and other undesirable phenomena due to the heat can be suppressed.

6) Method for Controlling Operation of Driving Optical Path Shifting Device

FIG. 10 shows the drive signal in the related art and the resultant trajectory of the optical path shifting device.

The trajectory achieved when the optical path shifting device 2 is driven by using the drive signal in the related art will first be described with reference to FIG. 10.

The waveform Wo in FIG. 10 shows the waveform of the drive signal in the related art. The horizontal axis of FIG. represents time t, and the vertical axis of FIG. 10 represents voltage V. The waveform Wo is the waveform of a simple trapezoidal wave, and a rising leg section La is a single straight line. The rising leg section La rises from potential V1, which is low potential, and changes to potential V2, which is high potential, in a period tb. After the potential V2 is maintained for a period tc, a falling leg section Lb formed of a single straight line returns to the potential V1, which is low potential, in the period tb, and the potential V1 is maintained for the period tc. The actions described above form one cycle and repeat to form the drive signal.

The trajectory Uo in FIG. 10 represents trajectory data on the amplitude of a measurement point P (FIG. 6) on the movable section 3 measured along the temporal axis with a laser displacement gauge when the waveform Wo is supplied as the drive signal to the optical path shifting device 2 to cause the movable section 3 to swing. The vertical axis of FIG. 10 showing the trajectory Uo represents the amount of displacement.

An ideal trajectory Uo is the trajectory of the reversed-phase trapezoidal wave having the waveform Wo and having the linear portions of the upper and lower bases maintained for a long period. It is desirable that the linear portions each correspond to a flat section and has no overshoot or other fluctuations but is stably flat. That is, when the movable section 3 iteratively inclines by the predetermined angle toward the positive side of the arrow M (FIG. 5) and by the predetermined angle toward the negative side of the arrow M, it is desirable that the movable section 3 does not rattle but smoothly moves and stably stops at opposite ends of the movement for a long period.

In contrast, the trajectory Uo of the movable section 3 has an undershoot Q1 at the bottom of a falling edge and has an overshoot Q2 in the vicinity of the end of the following flat section. Further, an overshoot Q3 occurs in an upper portion of the subsequent rising edge, and an undershoot Q4 occurs in the vicinity of the end of the following flat portion.

7) Description of Drive Signal Waveform

Figure 8:
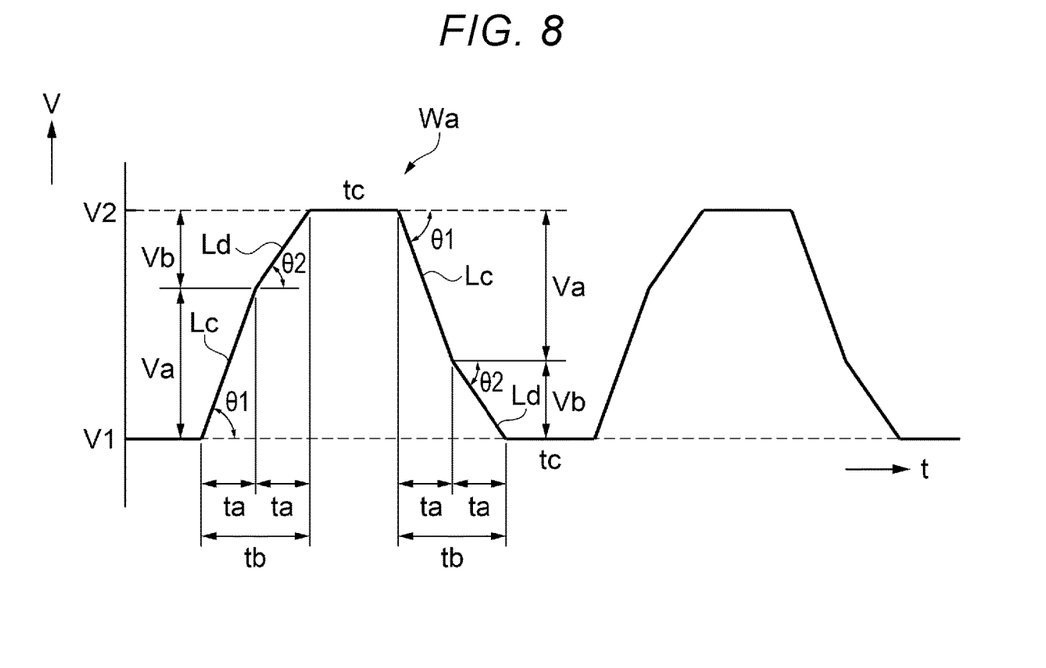
FIG. 8 is a waveform diagram of a drive signal.

FIG. 8 is a waveform diagram of the drive signal according to the present embodiment. A characteristic drive signal waveform in the present embodiment will be described in comparison with the waveform Wo in FIG. 10.

The waveform Wa in FIG. 8 is the waveform of the drive signal DS in the present embodiment. The waveform Wa is based on the waveform of a trapezoidal wave and has characteristic leg sections corresponding to the legs of the trapezoidal shape, that is, the leg sections each bend in the middle thereof. In the present specification, to distinguish the simple trapezoidal waveform from the waveform according to the present embodiment, the waveform according to the present embodiment is referred to as a trapezoidal wave. The legs of the trapezoidal wave are referred to as leg sections.

The rising waveform will first be described.

In the waveform Wa, each rising leg section is formed of two straight line, and the inclination of the rising leg section decreases in the middle thereof. In detail, each rising leg section is formed of a leg section Lc in the form of a first straight line and a leg section Ld in the form of a second straight line connected to the leg section Lc. The leg section Lc rises from the potential V1, which is low potential, and connects to the leg section Ld in a period ta. The leg section Ld changes to the potential V2 in the period ta. The period required for the potential to transition from the potential V1 to the potential V2 is the period tb, and the period ta is half the period tb. That is, the period ta×2=period tb.

The rising angle θ2 of the leg section Ld is smaller than the rising angle θ1 of the leg section Lc, which rises from the potential V1, as shown in FIG. 8. That is, the inclination of the leg section Ld is smaller than the inclination of the leg section Lc.

As described above, the waveform Wa is so shaped that the leg section Lc switches to the leg section Ld in the time ta, which is the first half of the period tb, which is required for the potential to transition from the potential V1 to the potential V2. In other words, the rising leg section bends at the middle point of the rising period tb, and the inclination decreases thereafter. The voltage application periods in the leg sections Lc and Ld are both the period ta, but the leg sections Lc and Ld differ from each other in terms of inclination, so that a voltage change Va in the leg section Lc differs from a voltage change Vb in the leg section Ld and are related to each other in the form of the relationship expressed by Expression (1) below.

Provided that the voltage application period ta in leg section Lc=the voltage application period ta in leg section Ld, voltage change *Va* in leg section *Lc*>voltage change *Vb* in leg section *Ld*     (1)

The falling waveform will next be described.

After the potential V2 is reached via the leg sections Lc and Ld of the rising waveform, the potential V2 is maintained as the flat section for the period tc, and the potential returns to the potential V1 via the falling leg section.

The falling waveform is the upside-down rising waveform. Reversing the waveform diagram upside down and replacing the voltage V2 with the voltage V1 and the voltage V1 with the voltage V2 allow the description of the falling waveform to be the same as the description of the rising waveform described above, and the leg sections each bend in the middle thereof.

After the potential V1 is reached via the falling waveform, the potential V1 is maintained as the flat section for the period tc. One cycle of the waveform Wa is thus achieved. Since the falling waveform is the upside-down rising waveform, the relationship expressed by Expression (1) is satisfied.

8) Example

Figure 9:
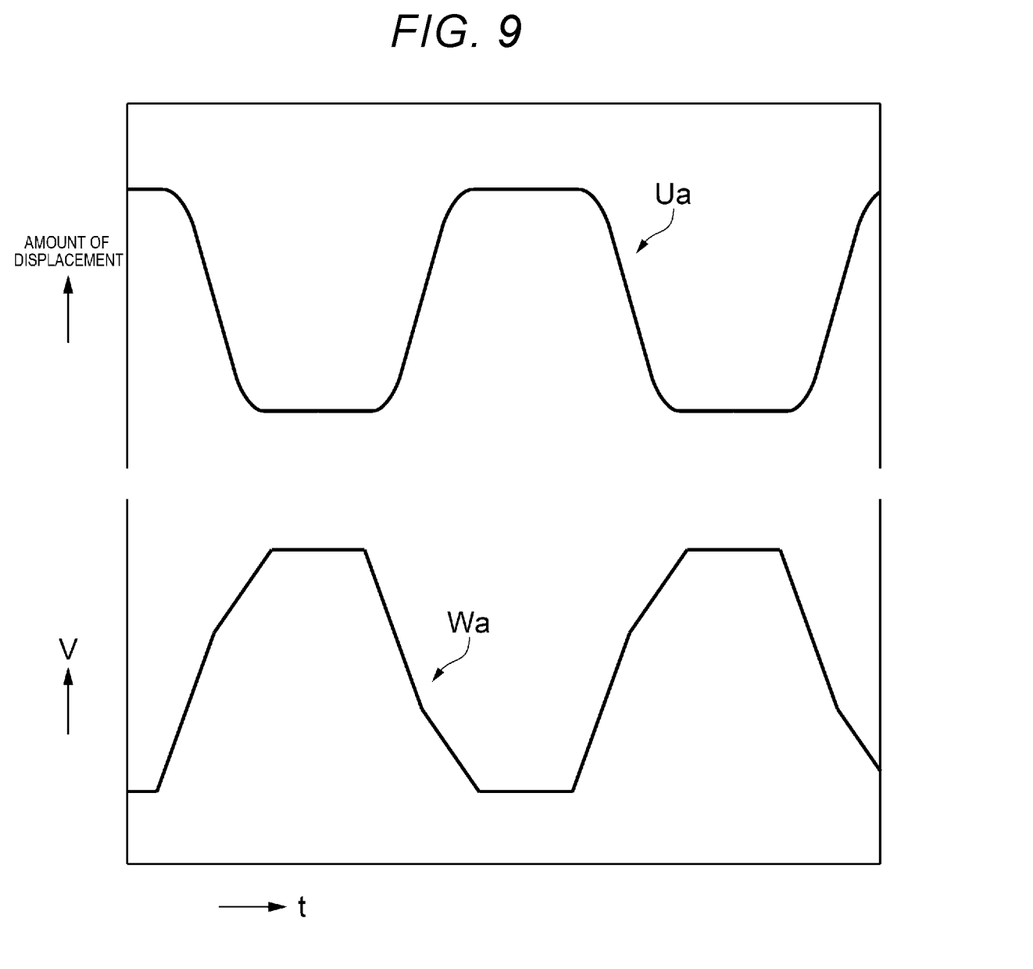
FIG. 9 shows the drive signal and the resultant trajectory of the optical path shifting device.

FIG. 9 shows the drive signal according to the present embodiment and the resultant trajectory of the optical path shifting device, and FIG. 9 corresponds to FIG. 10. The following description will be made about an actual trajectory achieved when the optical path shifting device 2 is driven based on the drive signal according to the present embodiment with reference also to FIGS. 8 and 10.

First, the waveform Wa in FIG. 9 appears to have a smaller degree of bending of the leg sections as compared with that in FIG. 8, which is, however, caused by the fact that the temporal axis in FIG. 9 is demagnified, and FIGS. 8 and 9 show the same waveform.

A trajectory Ua in FIG. 9 represents trajectory data on the amplitude of the measurement point P (FIG. 6) on the movable section 3 measured along the temporal axis with a laser displacement gauge when the waveform Wa is supplied as the drive signal to the optical path shifting device 2 to cause the movable section 3 to swing, as in the description with reference to FIG. 10.

The waveform Wa of the drive signal shown in FIG. 9 has a frequency of 60 Hz and an amplitude of 3.3 V. The voltage change Va in the leg section Lc is set at about 1.8 V, and the voltage change Vb in the leg section Ld is set at about 1.5 V. When the drive signal is applied, the inclination of the movable section 3 is about ±0.13 degrees, which can be converted into the amplitude of the swinging measurement point P (FIG. 6), which is about ±60 μm. The thus set values vary in accordance with the size, the resolution, and the pixel interval of the liquid crystal display elements, the configuration of the optical path shifting device 2, and other factors and are therefore presented as an example of the set values in the present example.

The trajectory Ua shown in FIG. 9 is substantially flat after each falling edge and has no overshoot or undershoot, as compared with the trajectory Uo shown in FIG. 10. The trajectory Ua is substantially flat and has no overshoot or undershoot also after the following rising edge. That is, a trajectory substantially equal to the ideal trajectory is provided.

The reason of the above situation is as follows: The simple trapezoidal-wave drive signal in the related art causes overshoots to occur due to the voltage application in the leg section La formed of a single straight line, whereas the configuration in which the two leg sections Lc and Ld with the rear leg section having smaller inclination are provided in place of the single straight-line leg section allows suppression of abrupt change in voltage. In detail, it is considered that the waveform including the combination of the two leg sections Lc and Ld with the rear leg section having smaller inclination can adjust the excessive energy that causes overshoots in the leg section La in the related art to appropriate energy.

As described above, the optical path shifting device, the method for controlling the optical path shifting device, and the image display apparatus according to the present embodiment can provide the following effects.

The control circuit 120 uses the drive circuit 122 to control the operation of driving optical path shifting device 2. In detail, the drive circuit 122 generates the waveform Wa as the drive signal shown in FIG. 9 and drives the optical path shifting device 2 by using the waveform Wa. The movable section 3 can therefore be driven and controlled along a substantially ideal trajectory, unlike the control method using the related-art drive signal that causes overshoots and other undesirable behaviors.

A drive signal that achieves a more ideal trajectory than the trajectory provided by the control method using the related-art drive signal and a drive/control method that excels the related-art control method can therefore be provided.

The present disclosure is not limited to the embodiment describe above, and a variety of changes, improvements, and other modifications can be made to the embodiment described above. Variations will be described below.

Variation 1

Variation 1 will be described with reference to FIG. 8.

The aforementioned embodiment has been described with reference to the preferable example in which the leg section Lc switches to the leg section Ld in the time ta, which is the first half of the period tb, which is required for the drive signal to transition from the lower base to the upper base, but not necessarily, and a drive signal that can suppress an abrupt change in voltage only needs to be set. For example, the ratio of the voltage application period in the leg section Lc to the voltage application period in the leg section Ld may be 6:4 or 4:6. The ratio may still instead be 7:3 or 3:7. A change in the temporal ratio still ensures the relationship of "inclination of leg section Ld<inclination of leg section Lc," and the amounts of voltage change may be adjusted in accordance with the characteristics of the optical path shifting device 2.

Variation 2

The aforementioned embodiment has been described with reference to the case where the optical path changing plate 30 of the optical path shifting device 2 is made of glass having light transparency, but the material is not limited to glass, and a mirror having light reflectivity may instead be used. In this case, the optical device according to the embodiment can be used also as an optical device for optical scanning, an optical switch, an optical attenuator, and other devices.

Variation 3

The aforementioned embodiment has been described with reference to the configuration in which the spatial light modulator is formed of transmissive liquid crystal display elements, but the spatial light modulator may instead be formed of reflective liquid crystal display elements, such as a liquid-crystal-on-silicon (LCOS) device (LCoS is registered trademark), or a digital micromirror device (DMD). Further, the image display apparatus is not limited to a projector and may instead be a head mounted display (HMD) or a head-up display (HUD).

Contents derived from the embodiment will be described below.

A method for controlling an optical device according to the present application is a method for controlling an optical device including a movable section including an optical section that refracts incident video image light in accordance with the angle of incidence of the video image light and outputs the refracted video image light and a holding section that supports the optical section, and an actuator that causes the movable section to swing, the method including applying a drive signal to the actuator to cause the movable section to swing. The drive signal is a trapezoidal wave having a trapezoidal waveform. Each leg section of the trapezoidal wave has a first straight line and a second straight line connected to the first straight line. The inclination of the second straight line with respect to the flat section of the trapezoidal wave is smaller than the inclination of the first straight line with respect to the flat section of the trapezoidal wave. The drive signal is applied to the actuator along the first straight line, and the drive signal is then applied to the actuator along the second straight line.

According to the control method described above, unlike the simple trapezoidal-wave drive signal in the related art, which causes overshoots due to the voltage application in the leg section La formed of a single straight line, the drive signal according to the present application, in which each leg section is divided into the leg sections Lc and Ld formed of two straight lines and the inclination of the rear leg section is smaller than that of the front leg section, allows suppression of abrupt change in voltage.

A method for controlling the optical path shirting device 2 as an optical device that can suppress occurrence of overshoots and achieve a trajectory substantially equal to the ideal trajectory can therefore be provided.

The flat sections of the trapezoidal wave may be formed of high-potential and low-potential flat sections, and the first straight line may switch to the second straight line at the point of time in the middle of the rising period required for the potential to transition from the low potential to the high potential.

Further, the first straight line may switch to the second straight line at the time in the middle of the falling period required for the potential to transition from the high potential to the low potential.

The difference in the amount of potential change between the leg sections Lc and Ld can thus be optimized, whereby a trajectory substantially equal to the ideal trajectory can be achieved.

An optical device according to the present application includes a movable section including an optical section that refracts incident video image light in accordance with the angle of incidence of the video image light and outputs the refracted video image light and a holding section that supports the optical section, an actuator that causes the movable section to swing, and a drive circuit that applies a drive signal to the actuator. The drive signal is a trapezoidal wave having a trapezoidal waveform. Each leg section of the trapezoidal wave has a first straight line and a second straight line connected to the first straight line. The inclination of the second straight line with respect to the flat section of the trapezoidal wave is smaller than the inclination of the first straight line with respect to the flat section of the trapezoidal wave. The drive circuit applies the drive signal to the actuator along the first straight line and then applies the drive signal to the actuator along the second straight line.

The drive circuit 122 generates the waveform Wa as the drive signal shown in FIG. 9 and drives the optical path shifting device 2 by using the waveform Wa. The drive signal according to the present application, in which each leg section is divided into the leg sections Lc and Ld formed of two straight lines and the inclination of the rear leg section is smaller than that of the front leg section, allows suppression of abrupt change in voltage.

An optical path shirting device 2 that can suppress occurrence of overshoots and achieve a trajectory substantially equal to the ideal trajectory can therefore be provided.

An image display apparatus according to the present application includes the optical device described above and a projection optical system that enlarges and projects the video image light outputted from the optical device.

The projector 1 includes the optical path shifting device 2 and the projection optical system 112. The projector 1 further includes the control circuit 120 and the drive circuit 122, which control and drive the optical path shifting device 2. A projector 1 capable of producing a high-definition, sharp projection image that excels in image quality, instead of the related-art image display apparatus having poor image quality due to occurrence of overshoots, can therefore be provided.

What is claimed is:

1. A method for controlling an optical device including a movable frame including an optical path changing plate that refracts incident video image light in accordance with an angle of incidence of the video image light and outputs the refracted video image light and a holding frame that supports the optical path changing plate, and an actuator that causes the movable frame to swing, the method comprising
applying a drive signal to the actuator to cause the movable frame to swing,
wherein the drive signal is a trapezoidal wave having a low-potential flat section, a high-potential flat section, a rising leg section that transitions from the low-potential flat section to the high-potential flat section and a falling leg section that transitions from the high-potential flat section to the low-potential flat section,
the rising leg section of the trapezoidal wave has a first straight line rising from the low-potential flat section and a second straight line connected to the first straight line,
in the rising leg section, inclination of the second straight line with respect to the low-potential flat section of the trapezoidal wave is smaller than inclination of the first straight line with respect to the low-potential flat section of the trapezoidal wave,
the falling leg section of the trapezoidal wave has a first straight line falling from the high-potential flat section and a second straight line connected to the first straight line thereof, and
in the falling leg section, inclination of the second straight line with respect to the high-potential flat section of the trapezoidal wave is smaller than inclination of the first straight line with respect to the high-potential flat section of the trapezoidal wave.

2. The method for controlling an optical device according to claim 1,
wherein the first straight line switches to the second straight line at a point of time in middle of a rising period required for the potential to transition from the low-potential flat section to the high-potential flat section.

3. The method for controlling an optical device according to claim 1,
wherein the time period of the rising leg section is twice as long as the time period of the first straight line thereof.

4. The method for controlling an optical device according to claim 1,
wherein the time period of the falling leg section is twice as long as the time period of the first straight line thereof.

5. An optical device comprising:
a movable frame including an optical path changing plate that refracts incident video image light in accordance with an angle of incidence of the video image light and outputs the refracted video image light and a holding frame that supports the optical path changing plate;
an actuator that causes the movable frame to swing; and
a drive circuit that applies a drive signal to the actuator,
wherein the drive signal is a trapezoidal wave having a low-potential flat section, a high-potential flat section, a rising leg section that transitions from the low-potential flat section to the high-potential flat section and a falling leg section that transitions from the high-potential flat section to the low-potential flat section,
the rising leg section of the trapezoidal wave has a first straight line rising from the low-potential flat section and a second straight line connected to the first straight line thereof,
in the rising leg section, inclination of the second straight line with respect to the low-potential flat section of the trapezoidal wave is smaller than inclination of the first straight line with respect to the low-potential flat section of the trapezoidal wave,
the falling leg section of the trapezoidal wave has a first straight line falling from the high-potential flat section and a second straight line connected to the first straight line thereof, and
in the falling leg section, inclination of the second straight line with respect to the high-potential flat section of the trapezoidal wave is smaller than inclination of the first straight line with respect to the high-potential flat section of the trapezoidal wave.

6. An image display apparatus comprising:
the optical device according to claim 5; and
a projection optical system that enlarges and projects the video image light outputted from the optical device.

7. A method for controlling an optical device including a movable frame including an optical path changing plate that refracts incident video image light in accordance with an angle of incidence of the video image light and outputs the refracted video image light and a holding frame that supports the optical path changing plate, and an actuator that causes the movable frame to swing, the method comprising
applying a drive signal to the actuator to cause the movable frame to swing,
wherein the drive signal is a trapezoidal wave having a low-potential flat section, a high-potential flat section, a rising leg section that transitions from the low-potential flat section to the high-potential flat section and a falling leg section that transitions from the high-potential flat section to the low-potential flat section,
the falling leg section of the trapezoidal wave has a first straight line falling from the high-potential flat section and a second straight line connected to the first straight line, and
in the falling leg section, inclination of the second straight line with respect to the high-potential flat section of the trapezoidal wave is smaller than inclination of the first straight line with respect to the high-potential flat section of the trapezoidal wave.

8. The method for controlling an optical device according to claim 7,
wherein the first straight line switches to the second straight line at a point of time in middle of a falling period required for the potential to transition from the high-potential flat section to the low-potential flat section.

9. The method for controlling an optical device according to claim 7,
wherein the time period of the falling leg section is twice as long as the time period of the first straight line thereof.

10. The method for controlling an optical device according to claim 7,
wherein the rising leg section of the trapezoidal wave has a first straight line rising from the low-potential flat section and a second straight line connected to the first straight line thereof, and
in the rising leg section, inclination of the second straight line with respect to the low-potential flat section of the trapezoidal wave is smaller than inclination of the first straight line with respect to the low-potential flat section of the trapezoidal wave.

11. The method for controlling an optical device according to claim 10,
wherein the time period of the rising leg section is twice as long as the time period of the first straight line thereof.

* * * * *

UNITED STATES PATENT AND TRADEMARK OFFICE
CERTIFICATE OF CORRECTION

| | | |
|---|---|---|
| PATENT NO. | : 11,669,000 B2 | Page 1 of 1 |
| APPLICATION NO. | : 16/874762 | |
| DATED | : June 6, 2023 | |
| INVENTOR(S) | : Takao Hirakura | |

It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Twenty-fifth Day of June, 2024

Katherine Kelly Vidal
*Director of the United States Patent and Trademark Office*